July 7, 1959  V. F. KRAHN  2,893,537
CROP PICKUP MECHANISM
Filed Jan. 8, 1957  2 Sheets-Sheet 1
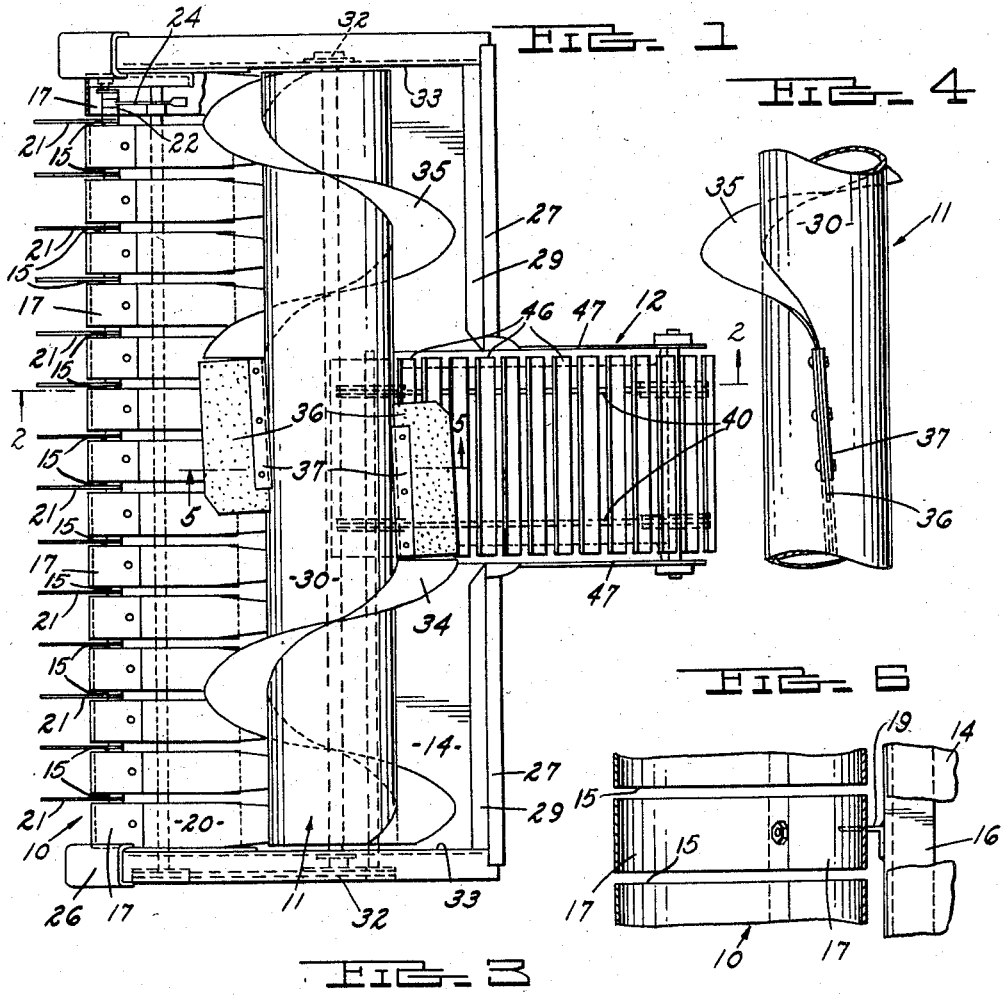
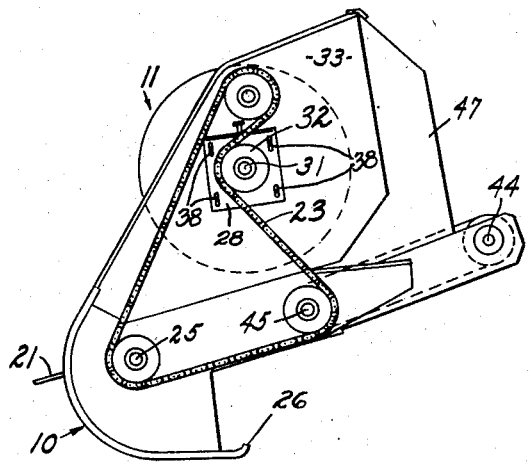
V. F. KRAHN
INVENTOR.
E. C. MC RAE
BY J. R. FAULKNER
P. F. HILDER
ATTORNEYS July 7, 1959 V. F. KRAHN 2,893,537
CROP PICKUP MECHANISM
Filed Jan. 8, 1957 2 Sheets-Sheet 2
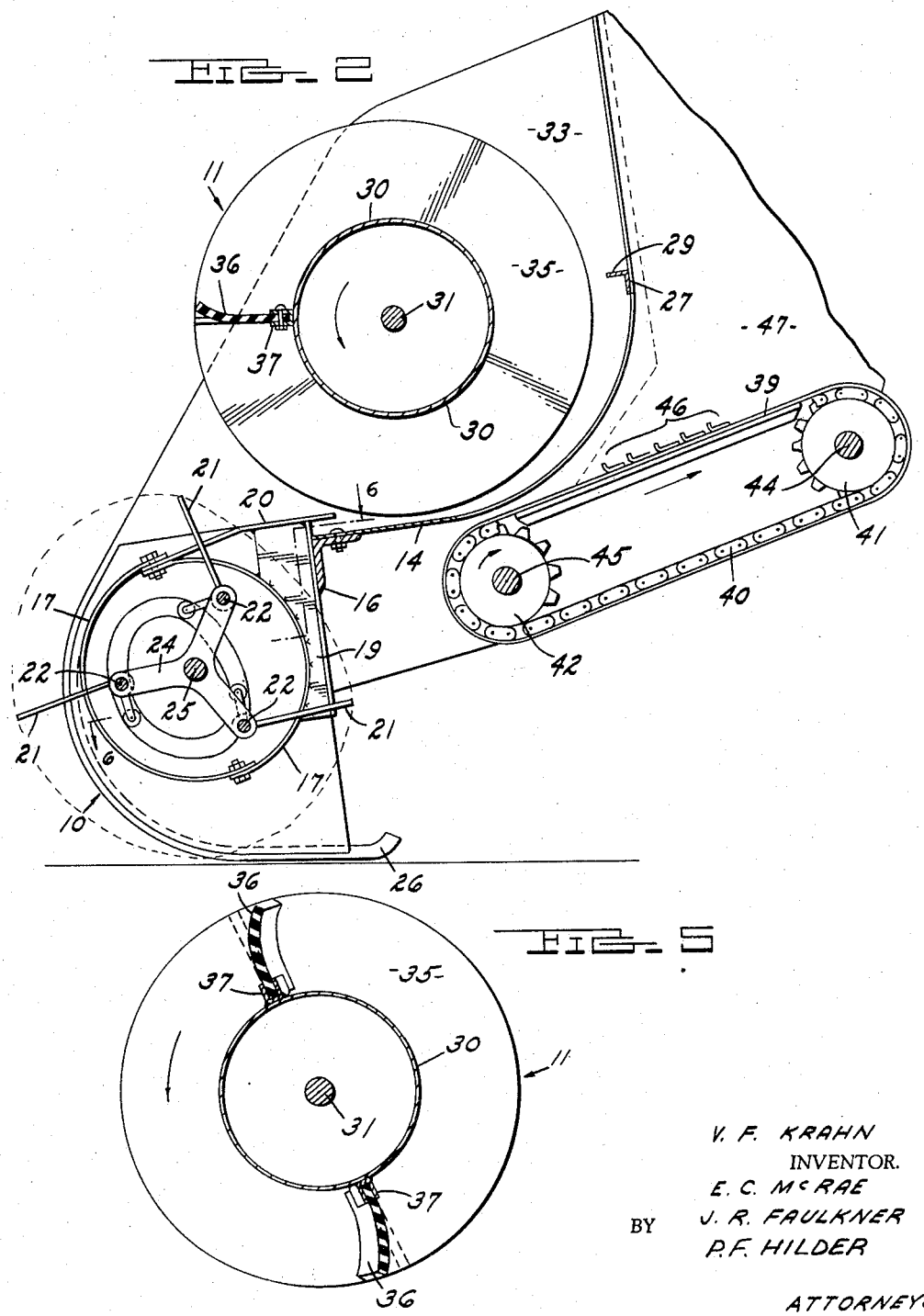
V. F. KRAHN
E. C. McRAE
J. R. FAULKNER
P. F. HILDER
INVENTOR.
BY
ATTORNEYS

United States Patent Office 2,893,537
Patented July 7, 1959

2,893,537

CROP PICKUP MECHANISM

Vincent F. Krahn, Birmingham, Mich., assignor to Ford Motor Company, Dearborn, Mich., a corporation of Delaware Application January 8, 1957, Serial No. 633,127

9 Claims. (Cl. 198—104)

This invention relates to pickups for picking up a severed crop, moving it laterally to be condensed and depositing it upon a moving apron.

Windrow pickups and other hay-type pickups, whether or not combined with a cutterbar, frequently utilize a series of rake teeth which project through circumferentially extending slots in a cylinder so as to raise the crop from the ground and deposit it upon a transversely extending platform. A feed auger extending lengthwise of the platform serves to move the crop laterally so as to condense it and deposit it upon a moving apron which carries it to the rear for further processing, such as in combines, hay balers and forage harvesters. The present invention relates to such an organization embodying an improved auger construction for moving the crop laterally and depositing it on the apron.

In the form shown of the present invention, the feed auger has two reversed flights feeding towards a rearwardly-moving apron at the mid-portion of the auger, the flights terminating in a pair of somewhat flexible flaps extending generally longitudinally of the auger for depositing the crop on the apron at a more or less uniform rate. The flexible flaps, which are positioned on the auger opposite the end of the apron, are of such flexibility as to yield when required to avoid packing of the crop and possible jamming of the auger. Also, due to the flexibility of the flaps, a more uniform rate of delivery to the apron is obtained.

Among the objects of the present invention are to provide an improved crop pickup organization and auger therefor which will deliver the crop to the apron at a more uniform rate, to provide such an organization in which packing and jamming of the auger is obviated, to provide such an organization of simplified construction, and to generally improve mechanisms of the type described.

Other objects and the nature and scope of the invention will be more apparent from the detailed description to follow.

My invention is clearly defined in the appended claims. In the claims, as well as in the description, parts may at time be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

Figure 1 is a somewhat diagrammatic top plan view of a crop pickup and feed mechanism made according to the present invention.

Figure 2 is a vertical section, on a somewhat reduced scale, of the crop pickup and feed mechanism, taken generally along the line 2—2 of Figure 1.

Figure 3 is an end elevation on a reduced scale of the crop pickup shown in Figure 1.

Figure 4 is an elevation of a portion of the feed auger.

Figure 5 is a somewhat diagrammatic transverse section of the feed auger, taken generally along the line 5—5 of Figure 1.

Figure 6 is a fragmentary section of a slotted pickup cylinder, taken generally along the line 6—6 of Figure 2.

Referring now to the drawings, and particularly to Figures 1 and 2, the crop pickup of the present invention comprises a sheet metal frame generally as shown for supporting a crop pickup cylinder 10, a condensing feed auger 11 and a central, rearwardly extending apron 12. The frame also provides a smooth, transversely extending feed platform 14 extending beneath and upwardly behind the auger 11.

Referring now more particularly to the crop pickup cylinder 10, this cylinder comprises a transversely extending sheet metal body, at least the forward surface of which is rounded, preferably of generally cylindrical form. The cylinder 10 is provided with vertical slots 15 at uniform intervals along its length, the cylinder preferably being fabricated from strips of sheet metal supported from a common transverse member 16 extending parallel to and a short distance behind the pickup cylinder 10 and constituting a portion of the pickup frame. Referring to Figure 2, it will be seen that the cylinder is made up of a plurality of cylindrical sections separated by the slots 15 and formed of complementary arcuate strips 17, the arcuate strips each extending through about 180° and being bolted together to form a cylinder extending through 360°. The rear arcuate strip 17 is supported by being welded or otherwise secured to a vertically extending angle member 19, the angle members 19 being secured at intervals to the transverse member 16. In addition, a generally straight strip 20 of sheet metal extends generally tangentially rearwardly from the top surface of each section of the cylinder, and preferably is secured to the upper end of the angle member 19.

A series of spring wire tines 21 are fixed to transversely extending rods 22, preferably three in number, which are mounted for oscillation in a spider 24 adjacent each end of the cylinder. A tine 21 from each of the rods 22 projects generally radially from each of the slots 15 of the cylinder.

The spiders 24 are fixed to a central shaft 25 extending axially of the cylinder 10 and supported for rotation in the pickup frame. A chain drive 23 serves to rotate the central shaft 25 and spiders 24. As the spiders 24 are rotated, the rods 22 supporting the tines 21 are oscillated by means of levers (not shown) projecting from the rods and guided by a cam (not shown) so as to oscillate the rods 22 and change the inclination of the tines 21 from a radial direction as they are rotated. Changing inclination of the tines aids in hay pickup and gives the necessary clearance between the ends of the tines and the forward edge of the feed platform 14 and associated parts. The path of the ends of the tines 21 is generally indicated by broken line in Figure 2. A skid 26, located adjacent each end of the cylinder and constituting a portion of the frame of the crop pickup, is maintained in contact with the ground most of the time, keeps the transverse cylinder a minimum distance from the ground and aids in preventing contact of the tines 21 with the ground. The crop pickup cylinder described above is more or less conventional, and other cylinders of this general type may be substituted.

The transversely extending feed platform 14 is located immediately behind the crop pickup cylinder 10. The feed platform has a generally planar forward portion extending beneath the feed auger 11 for the full length of the auger and merging into an arcuate rearward portion rising immediately behind the auger and extending at least as high as the top of the auger (Figure 2). Preferably, the forward edge of the feed platform 14 is located slightly below the rearward ends of the tangentially extending strips 20 and provides a smooth surface for supporting and guiding the crop as it is moved centrally of the crop pickup by the auger 11. An angle 27 is secured to the surface of the feed platform 14 so as to provide a leg 29 projecting generally perpendicularly from the surface of the platform about midway of the height of the auger to aid in preventing the crop being moved by the auger from being carried higher thereby.

The feed auger 11 comprises a cylindrical sheet metal auger body 30 which is fixed to a concentric shaft 31 supported in end bearings for rotation, one end bearing 32 being shown. The auger body is provided with sheet metal conveyer flights 34 and 35 leading from the ends of the auger towards its midportion. The left flight 34, as viewed in Figure 1, is right handed and the right flight 35 is left handed so that, as the auger is rotated counterclockwise when viewed from the left as in Figure 2, it will traverse material along the feed platform 14 to the apron 12. The flights 34 and 35 are formed of sheet metal and are substantially rigid, each flight beginning at an end of the auger and terminating adjacent the forward end of the apron 12. Preferably, the inner ends (towards the apron) of the conveyer flights are on diametrically opposite sides of the conveyer body. The height of the auger above the feed platform 14 may be adjusted as required in accordance with the type of crop being harvested by means of raising or lowering the shaft and bearings 32, these bearings being capable of limited height adjustment on the vertical end walls 33, 33 of the feed platform (see Figure 3). Auger height adjustment is obtained by providing slotted bolt holes 38 in the bearing retainer 28 to permit limited height adjustment of the retainer on the end walls 33, 33 of the feed platform.

A relatively flexible flap 36 is mounted on the auger 11 adjacent the inner end of the conveyer flights 34 and 35, this flap extending generally axially longitudinally of the auger body 30. Preferably, flaps 36, 36 are about the same radial extent as the flights 34 and 35 and are formed of fabric-reinforced rubber conveyer belting mounted on the auger body by being received between the parallel flanges of a channel 37 welded to the auger body 30. Preferably, the flaps are set at a slight angle to the axis of the cylinder auger body 30 in the direction of the continuation of the flight (see Figure 4).

Initially, the flaps 36, 36 extend generally radially of the auger body 30 as indicated by the broken lines in Figure 5. However, upon use, the flaps will take up a rearward set as indicated in full line in Figure 5, this rearward set not being harmful and even somewhat improving the action of the feed auger. The flaps 36, 36 extending from the inner ends of the conveyer flights 34 and 35 overlap, each flap extending for most of the width of the apron 12. The free outer end (end away from the conveyer flights 34 and 35) of the flaps 36, 36 may project beyond the channels 37, 37 so as to be unsupported for greater flexibility, as indicated in Figure 1.

The apron 12 preferably is located centrally of the crop pickup cylinder 10 and feed platform 14, usually extending rearwardly and upwardly from the feed platform. The apron 12 may comprise an endless conveyer belt formed by two or more drive chains 40 carried by sprockets 41 and 42 which are in turn fixed to shafts 44 and 45, respectively. Closely spaced slats or battens 46 are mounted on the outer surface of the chains 40 to form the apron. The forward end of the apron 12 is located immediately below the forward, generally horizontal portion of the feed platform 14 generally centrally of the crop pickup, the upwardly curving rear portion of the feed platform being cut away to provide a rearwardly extending channel above the apron 12 through which the crop is conveyed to the rear. Side walls 47, 47 (Figure 1), one on each side of the apron, confine the crop to the surface of the apron.

The shafts 44 and 45 are mounted for rotation in the side walls 47, 47, the side walls constituting a portion of the crop pickup frame. Preferably, the crop pickup unit is pivotally mounted from the body unit, not shown, of a machine such as a combine, hay baler or forage harvester for swinging in a vertical arc on an axis concentric with the shaft 44 for convenience in transmitting power for drive of the apron, pickup cylinder, and feed auger. The power drive is through the shafts 44 and 45 which are interconnected by the sprockets 41 and 42 and the drive chains 40. The shaft 45 may be extended to the left side of the unit so as to drive the auger 11 and crop pickup cylinder 10 through customary chain and sprocket drives, including the chain 23.

As the unit of the present invention is operated, the crop, which may be in the form of a windrow or may be scattered on the ground for the full width of the pickup cylinder 10, is picked up by the wire tines 21 and deposited on the feed platform 14. Rotation of the feed auger in the direction indicated in the drawings will move the crop towards the apron 12. As the crop reaches the portion of the feed platform opposite the apron, the flaps 36, 36 push the crop rearwardly beyond the edge of the feed platform and onto the apron 12 which conveys it rearwardly for processing. Even under normal conditions, a crop is never uniformly distributed, either in a windrow or when spread out on the ground. The somewhat flexible flaps 36 will bend backwardly somewhat if crop tends to accumulate at the forward end of the apron, the flaps passing over some of the crop and making for a more uniform delivery of crop to the apron with attendant advantages in the further processing of the crop. Further, the ability of the flaps to pass over a portion of the crop collected at the forward end of the apron 12 eliminates packing of the crop and possibility of jamming and bending of the auger and breakage of the auger drive. Accordingly, the auger 11 may be mounted in bearings that are not free to rise upon packing of the crop to avoid damage to the auger as in many constructions, and the auger may be set at a reduced height above the feed platform 14 than would otherwise be required without the flexible flaps 36, 36.

The present invention is of equal applicability to a feed auger having a single flight located at the side of a feed platform. Also, a greater or lesser number of flaps may be employed regardless of the number of flights on the auger.

I claim:

1. A condensing auger for moving severed crop along a platform and onto an apron extending perpendicularly to the length of the platform, the auger having a spiral flight extending for only a portion of its length, and a flexible, rubber-like flap adjacent to but beyond the end of the flight and extending generally axially of the auger from the end of the flight for moving the crop from the platform onto the apron, the flap extending radially of the auger for about the same distance as the flight.

2. A condensing auger for moving severed crop along a platform and onto an apron extending perpendicularly to the length of the platform, the auger having a spiral flight terminating in a flexible, rubber-like flap extending generally axially of the auger from the end of the flight, the flap extending radially of the auger for about the same distance as the flight.

3. In a crop pickup; an elongated, transversely extending crop receiving platform having a generally horizontal portion and a rear wall extending upwardly from the rear of the horizontal portion and provided with an outlet opening, a rotary member extending longitudinally of the platform and mounted a short distance thereabove, means for driving the rotary member, and a flexible, rubberlike flap mounted on the rotary member and extending generally axially thereof, the flap being located in front of the opening and projecting outward generally radially of the rotary member.

4. In a crop pickup; an elongated, transversely extending crop receiving platform having a generally horizontal portion and a rear wall extending upwardly from the rear of the horizontal portion and provided with an outlet opening, a condensing auger extending longitudinally of the platform and mounted a short distance thereabove, the auger having at least one spirally extending flight and being driven in a direction to convey crop along the platform towards the opening, the flight terminating adjacent the opening, and a flexible, rubberlike flap mounted on the auger and extending generally axially thereof, the flap being located in front of the opening and projecting outward generally radially of the auger.

5. In a crop pickup; an elongated, transversely extending crop receiving platform having a generally horizontal portion and a rear wall extending upwardly from the rear of the horizontal portion and provided with an outlet opening, a condensing auger extending longitudinally of the platform and mounted a short distance thereabove, the auger comprising a cylindrical sheet metal body having at least one coaxial spirally extending flight projecting radially from its outer surface and being driven in a direction to convey crop along the platform towards the opening, the flight terminating adjacent the opening, and a flexible, rubberlike flap mounted on the auger and extending generally axially thereof, the flap being located in front of the opening and projecting outward generally radially of the auger for about the same distance as the flight.

6. In a crop pickup; an elongated, transversely extending crop receiving platform having a generally horizontal portion and a rear wall extending upwardly from the rear of the horizontal portion and provided with an outlet opening, a condensing auger extending longitudinally of the platform and mounted a short distance thereabove, the auger having at least one spirally extending flight and being driven in a direction to convey crop along the platform towards the opening, the flight terminating adjacent the opening, and a flexible, rubberlike flap mounted on the auger and extending generally axially thereof from adjacent the end of the flight, the flap being located in front of the opening and projecting outward generally radially of the auger for about the same distance as the flight.

7. In a crop pickup; an elongated, transversely extending crop receiving platform having a generally horizontal portion and a rear wall extending upwardly from the rear of the horizontal portion and provided with an outlet opening, feed means for conveying material rearwardly from said outlet opening, a condensing auger extending longitudinally of the platform, and means for driving the feed means and auger, the auger having at least one spirally extending flight on each end thereof, the flights being of opposite hand and the auger being driven in a direction to convey crop towards the central zone of the auger, each flight terminating adjacent the outlet opening, and a flexible, rubberlike flap extending generally axially of the auger from adjacent the inner end of each flight, the flaps projecting generally radially of the auger.

8. In a crop pickup; an elongated, transversely extending crop receiving platform having a generally horizontal portion and a rear wall extending upwardly from the rear of the horizontal portion and provided with an outlet opening, feed means for conveying material rearwardly from said outlet opening, a condensing auger extending longitudinally of the platform, and means for driving the feed means and auger, the auger having at least one spirally extending flight on each end thereof, the flights being of opposite hand and the auger being driven in a direction to convey crop towards the central zone of the auger, each flight terminating adjacent the outlet opening, and a flexible, rubberlike flap extending generally axially of the auger from adjacent the inner end of each flight, the flaps projecting generally radially of the auger for about the same distance as the flights.

9. In a crop pickup; an elongated, transversely extending crop receiving platform having a generally horizontal portion and a rear wall extending upwardly from the rear of the horizontal portion and provided with an outlet opening, feed means for conveying material rearwardly from said outlet opening, a condensing auger extending longitudinally of the platform, and means for driving the feed means and auger, the auger having at least one spirally extending flight on each end thereof, the flights being of opposite hand and the auger being driven in a direction to convey crop towards the central zone of the auger, each flight terminating adjacent the outlet opening, and a flexible, rubberlike flap extending generally axially of the auger from adjacent the inner end of each flight, the flaps projecting generally radially of the auger and being located substantially diametrically opposite each other.

References Cited in the file of this patent

UNITED STATES PATENTS

| | | |
|---|---|---|
| Re. 21,161 | Korsmo et al. | July 25, 1939 |
| 1,255,276 | Barnett et al. | Feb. 5, 1918 |
| 2,235,052 | Trier | Mar. 18, 1941 |
| 2,286,095 | Innes | June 9, 1942 |
| 2,476,265 | Peterson | July 12, 1949 |
| 2,513,966 | Pool et al. | July 4, 1950 |
| 2,630,664 | Hansen | Mar. 10, 1953 |
| 2,706,032 | Kowalik | Apr. 12, 1955 |
| 2,795,314 | Becker | June 11, 1957 |